United States Patent
Suzuki et al.

(10) Patent No.: US 6,883,496 B2
(45) Date of Patent: Apr. 26, 2005

(54) CONTROL SYSTEM AND CONTROL METHOD FOR THROTTLE VALVE DRIVING APPARATUS

(75) Inventors: Norio Suzuki, Saitama (JP); Yosuke Tachibana, Saitama (JP); Jun Takahashi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 24 days.

(21) Appl. No.: 10/615,469

(22) Filed: Jul. 8, 2003

(65) Prior Publication Data

US 2004/0007208 A1 Jan. 15, 2004

(30) Foreign Application Priority Data

Jul. 11, 2002 (JP) .......................................... 2002-202653

(51) Int. Cl.[7] .............................................. F02D 41/00
(52) U.S. Cl. ........................................ 123/361; 123/396
(58) Field of Search ............................ 12/361, 396, 399

(56) References Cited

U.S. PATENT DOCUMENTS

| | | | |
|---|---|---|---|
| 5,681,240 A | | 10/1997 | Sunada et al. |
| 6,450,145 B1 | * | 9/2002 | Machida et al. ............ 123/396 |
| 6,494,181 B1 | * | 12/2002 | Kuretake .................... 123/399 |
| 6,497,214 B1 | * | 12/2002 | Yagi ........................... 123/399 |
| 6,513,492 B1 | | 2/2003 | Bauerle et al. |
| 6,561,162 B1 | * | 5/2003 | Kuretake .................... 123/399 |

FOREIGN PATENT DOCUMENTS

| | | |
|---|---|---|
| DE | 102 34 434 A1 | 2/2003 |
| EP | 0 584 799 A1 | 3/1994 |
| EP | 0 874 146 A2 | 10/1998 |
| JP | 10-176582 | 6/1998 |

* cited by examiner

*Primary Examiner*—John T. Kwon
(74) *Attorney, Agent, or Firm*—Lahive & Cockfield, LLP; Anthony A. Laurentano, Esq.

(57) ABSTRACT

In the event that an abnormality is detected in a throttle valve driving apparatus, an upper limit value for a throttle valve opening is set according to a vehicle speed when a brake switch is not switched on. When the brake switch is on, the upper limit value is set at a predetermined idle opening. When the target opening which is calculated according to an accelerator pedal depression amount is larger than the upper limit value, the target opening is changed to the upper limit value.

8 Claims, 3 Drawing Sheets

CONTROL SYSTEM AND CONTROL METHOD FOR THROTTLE VALVE DRIVING APPARATUS

BACKGROUND OF THE INVENTION

1. Field of the Invention

The present invention relates to a control system and a control method for a throttle valve driving apparatus. More particularly, the present invention relates to such as to implement an abnormality determination on a sensor for detecting the opening of a throttle valve and a fail-safe operation in the event that such abnormality occurs.

2. Description of the Related Art

JP-A-10-176582 discloses a throttle control system comprising two throttle position sensors for detecting the position of a throttle valve (valve opening) of an internal combustion engine and two accelerator position sensors for detecting the position of an accelerator pedal according to the amount of depression of the accelerator pedal. In the throttle control system, a target opening for the throttle valve is set according to outputs from the accelerator position sensors, and a throttle valve driving motor is controlled such that a valve opening detected by the throttle position sensors becomes the target opening.

In this throttle control system, the abnormality of the throttle position sensors is determined by comparing a deviation between outputs from the two throttle position sensors with a predetermined threshold value. In addition, an abnormality determination is similarly carried out on the accelerator position sensors. Then, in the event that the throttle position sensors are determined abnormal, a fail-safe operation is implemented in which of the two sensor outputs, a sensor outputs which indicates a larger throttle opening is used for control. In addition, in the event that the accelerator position sensors are determined abnormal, a fail-safe operation is implemented in which of two sensor outputs, a sensor output which indicates a smaller-amount of depression of the accelerator pedal is used for control.

As to abnormality that occurs in the throttle control system, there is, for example, a case where it is possible to determine which of the two throttle position sensors is abnormal. In case the aforesaid fail-safe operation is applied in such a case, since the sensor output is selected which attempts to limit further the output of the internal combustion engine, the operability of a vehicle is limited more than required.

SUMMARY OF THE INVENTION

The invention was made in view of this point. An object of the invention is to provide a control system and a control method for a throttle valve driving apparatus which can implement a fail-safe operation more appropriately when abnormality occurs so as not only to ensure sufficient safety but also to improve the operability of a vehicle when compared with a related-art throttle control system.

According to a first aspect of the invention, there is provided a control system for a throttle-valve driving apparatus which comprises a driving unit (6) for driving a throttle valve (3) provided along an induction system (2) of an internal combustion engine (1) installed in a vehicle, a biasing unit (4, 5) for holding the throttle valve (3) at a predetermined hold opening (THDEF) while the throttle valve (3) is not driven by the driving unit (6), an accelerator operation amount detecting unit (9M, 9S) for detecting an operation amount (AP) of an accelerator pedal of the vehicle and a throttle valve position detecting unit (8M, 8S) for detecting an opening (TH) of the throttle valve, the control system comprising a target opening setting unit for setting a target opening (THCMD) for the throttle valve opening based on the accelerator pedal operation amount (AP), a driving control unit for controlling the driving unit (6) so that the throttle valve opening (TH) becomes the target opening (THCMD), an abnormality determining unit for determining an abnormality of the throttle valve driving apparatus, a speed detecting unit for detecting a running speed (VP) of the vehicle, and a limiting unit for limiting the opening (TH) of the throttle valve according to the running speed (VP) of the vehicle when the abnormality of the throttle valve driving apparatus is determined by the abnormality determining unit.

According to the construction, when the throttle valve driving apparatus is determined abnormal, since the throttle valve opening is limited according to the running speed of the vehicle, it is possible to implement a throttle valve opening limitation which is suitable for the running speed of the vehicle. As a result, in the event that the abnormality is determined while the vehicle is running on, for example, a highway, it is possible to allow the vehicle to continue to run without decreasing the running speed unnecessarily.

According to a second aspect of the invention, there is provided a control system for a throttle valve driving apparatus as set forth in the first aspect of the invention, wherein the limiting unit limits the throttle valve opening (TH) to a predetermined idle opening (THIDLE) which is smaller than the predetermined hold opening, or less when a brake pedal of the vehicle is operated.

According to the construction, since the throttle valve opening is limited to the predetermined idle opening or less when the brake pedal is operated, the speed of the engine can be decreased in an ensured fashion when the driver intends to decrease the speed of the vehicle to thereby secure the safety.

According to a third aspect of the invention, there is provided a control system for a throttle valve driving apparatus as set forth in the first or second aspect of the invention, wherein the limiting unit sets an upper limit value (THBASFSG) of the throttle-valve opening at a larger value as the running speed (VP) of the vehicle increases.

According to the construction, since the upper limit value is set at a larger value as the vehicle running speed increases, in the event that the vehicle running speed is high when the abnormality is determined, the throttle valve is permitted to open to the relatively larger upper value. As a result, it is possible to maintain a relatively higher speed or to gradually decrease the vehicle running speed.

Further, the above-mentioned object can be achieved by a control method, according to the present invention, for a throttle valve driving apparatus which comprises a driving unit for driving a throttle valve provided along an induction system of an internal combustion engine installed in a vehicle, a biasing unit for holding the throttle valve at a predetermined hold opening while the throttle valve is not driven by the driving unit, an accelerator operation amount detecting unit for detecting an operation amount of an accelerator pedal of the vehicle and a throttle valve position detecting unit for detecting an opening of the throttle valve, the control method comprising setting a target opening for the throttle valve opening based on the accelerator pedal operation amount, controlling the driving unit so that the throttle valve opening becomes the target opening, determining an abnormality of the throttle valve driving apparatus; detecting a running speed of the vehicle and limiting the opening of the throttle valve according to the running speed of the vehicle when the abnormality of the throttle valve driving apparatus is determined. The limiting step may limit the throttle valve opening to a predetermined idle opening which is smaller than the predetermined hold opening, or less when a brake pedal of the vehicle is operated. The limiting unit may set an upper limit value of the throttle valve opening at a larger value as the running speed of the vehicle increases.

DETAILED DESCRIPTION OF THE INVENTION

An embodiment of the invention will be described by reference to the accompanying drawings.

Figure 1:
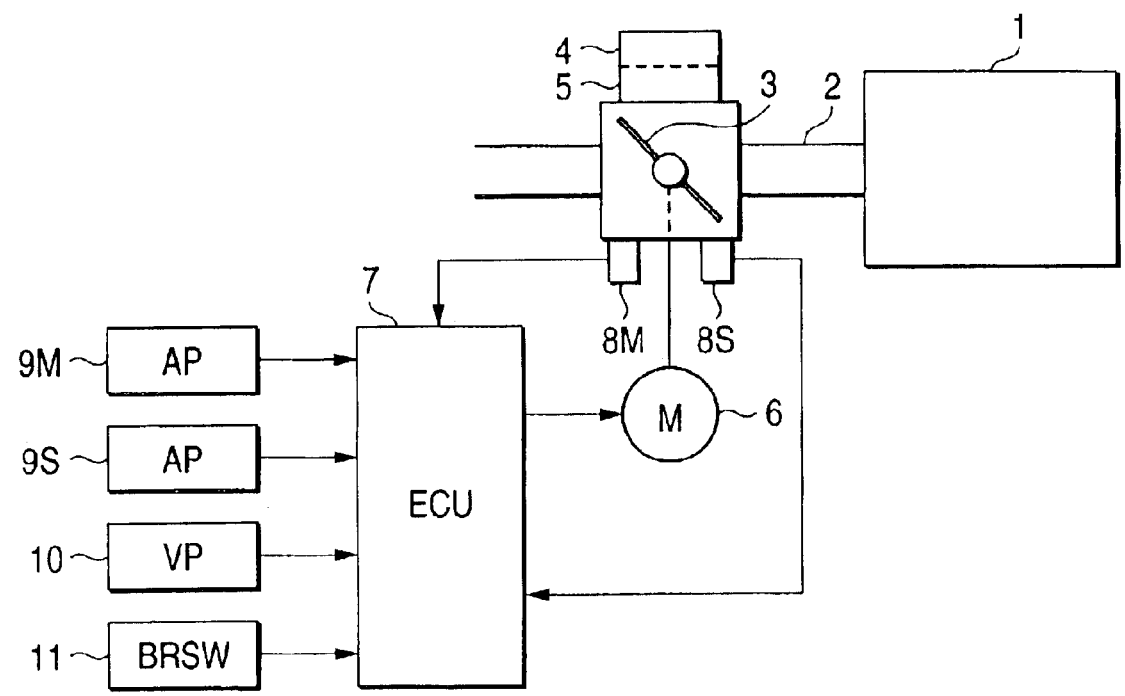
FIG. 1 is a drawing showing the constructions of a throttle valve driving apparatus and a control system therefor according to an embodiment of the invention.

FIG. 1 is a drawing showing configurations of a throttle valve driving apparatus and a control system therefor according to an embodiment of the invention. A throttle valve 3 is provided along an induction passage 2 of an internal combustion engine (hereinafter, referred to as an "engine") 1. A return spring 4 for biasing the throttle valve 3 in a valve closing direction and a default spring 5 for biasing the throttle valve 3 in a valve opening direction are mounted on the throttle valve 3. In addition, the throttle valve 3 is constructed to be driven by a motor 6 via gears (not shown). In a state in which the drive of the motor 6 is not imparted to the throttle valve 3, the opening TH of the throttle valve 3 is held at a default opening THDEF (for example, 7.5 degrees) where the biasing force of the return spring 4 and the biasing force of the default spring 5 balance with each other. The default opening THDEF is set to allow a vehicle driven by the engine 1 to run to escape from a danger even when the throttle valve driving apparatus becomes out of order.

The motor 6 is connected to an electronic control unit (hereinafter, referred to an "ECU") 7 for controlling the throttle valve 3, so that the operation thereof is controlled by the ECU 7. Two throttle valve position sensors 8M, 8S are provided on the throttle valve 3 for detecting the opening TH of the throttle valve 3, and detection signals of these sensors are supplied to the ECU 7. The reason why the two sensors having the same function are provided is because to ensure the safety when one of the two becomes out of order and the operability of the vehicle.

In addition, connected to the ECU 7 are two accelerator sensors 9M, 9S, a vehicle speed sensor 10 and a brake switch 11. The accelerator sensors 9A, 9S detect the amount of depression of an accelerator pedal (hereinafter, referred to as an "accelerator pedal operation amount") AP which indicates an output required by a driver of the vehicle driven by the engine 1. The vehicle speed sensor 10 detects the running speed (vehicle speed) VP of the vehicle. Detection signals of these sensors and switching signal of the brake switch 11 are supplied to the ECU 7. The brake switch 11 is a switch which is switched on when the driver of the vehicle operates the brake pedal and which is otherwise kept switched off.

As to the throttle valve position sensors 8M, 8S and the accelerator sensors 9M, 9S, when no such abnormality as will be described later on is detected, a detected value of one of the two sensors which is predetermined (for example, the throttle-valve position sensor 8M and the accelerator sensor 9M) is used for control.

The throttle valve driving apparatus includes the return spring 4, the default spring 5, the motor 6, and the throttle valve position sensors 8M, 8S, and in this specification, the throttle valve driving apparatus includes further the accelerator sensors 9M, 9S.

The ECU 7 has an input circuit, an AD conversion circuit, a central processing unit (CPU), a memory circuit and an output circuit. To the input circuit, detection signals of the throttle valve position sensors 8M, 8S, the accelerator sensors 9M, 9S and the vehicle speed sensor 10 are supplied The AD conversion circuit converts input signals into digital ones. The central processing unit (CPU) executes various types of processing. The memory circuit includes a ROM for storing programs executed by the CPU and maps and tables which are referred to in the programs and a RAM for storing the results of operations. The output circuit supplies driving current to the motor 6. The ECU 7 determines a target opening THCMD for the throttle valve 3 according to the amount AP of depression of the accelerator pedal, determines a control duty (control amount) for the motor 6 so that a detected throttle valve opening TH coincides with the target opening THCMD and supplies to the motor 6 an electric signal corresponding to the control duty so determined. Namely, the ECU 7 implements a feedback control so that the throttle valve opening TH coincides with the target opening THCMD. For example, a known PID (proportional integration differential) is applied to this feedback control, and the feedback control is implemented by a driving control processing executed by the CPU of the ECU 7.

The CPU of the ECU 7 further implements abnormality determinations on the throttle valve position sensors 8M, 8S, the accelerator sensors 9M, 9S, the return spring 4 and the default spring 5, and executes a fail-safe processing when an abnormality is detected.

(1) Abnormality determinations of the throttle valve position sensors 8M, 8S and the accelerator sensors 9M, 9S are implemented as below.

a) Output voltages of the respective sensors-are monitored, and when the output voltage of the sensor comes to remain at "0" V or a supply voltage, the sensor is determined abnormal. In this case, an abnormality determination flag FFSPETTHL is set at "1", and a detected value of the other sensor (for example, the throttle valve position sensor 8S when the throttle position sensor 8M is determined abnormal) which constitutes a pair together with the sensor which is determined abnormal is used to continue the control.

b) Outputs from the two sensors which constitute a pair are compared with each other, and when a difference between the outputs from the two sensors becomes equal to or larger than a predetermined value, either of the sensors is determined abnormal. Namely, assuming that a detected value of the throttle valve position sensor 8M is THM and that a detected value of the throttle valve position sensor 8S is THS, when |THM-THS| is larger than a predetermined value THFDET, either the sensor 8M or the sensor 8S is determined abnormal. In this case, a throttle valve position sensor abnormality flag FTHD is set at "1", and the power supply to the motor 6 is stopped, the throttle valve opening TH being maintained at the default opening THDEF.

On the other hand, the abnormality determination of the accelerator sensors 9M, 9S are implemented in the same manner as done for throttle position sensors. Then, when either the accelerator sensor 9M or the accelerator sensor 9S is determined abnormal using this method, the abnormality determination flag FFSPETTHL is set at "1", of accelerator pedal depression amounts AP detected by the two sensors, a smaller depression amount AP is selected for use for the control.

(2) An abnormality determination of the return spring 4 is implemented as below. Firstly, the throttle valve opening TH is controlled so as to become a first predetermined opening THOPN (for example, 20 degrees), and then, an output range for the control duty DUT of a driving signal supplied to the motor 6 is limited to, for example from 2.5% to 90%, the throttle valve opening TH being controlled to become a first check opening THRTN (for example, 14 degrees) which is smaller than the first predetermined opening THOPN but is larger than the default opening THDEF. Namely, a feedback control is executed so that the first check opening THRTN is made to be the target opening THCMD. As a result, in the event that the throttle valve opening TH can be controlled to fall within a predetermined range including the first check opening THRTN, the return spring 4 is determined normal, whereas in the event that no such control is possible, the return spring 4 is then determined abnormal. With the output range of the control duty DUT being limited to from 2.5% to 90%, in the event that the return spring 4 is normal, the feedback control to make the throttle valve opening TH become the first check opening THRTN can be executed. However, in the event that the return spring 4 is abnormal, no biasing force is applied which biases the throttle valve 3 in a valve closing direction and thus the throttle valve opening TH cannot be controlled to become the first check opening THRTN, thereby making it possible to determine that the return spring 4 is abnormal In this embodiment, the control duty DUT is normally set within: a range from −90% to 90%. In the event that the control duty DUT is set at a positive value, the throttle valve 3 is driven by the motor 6 in a valve opening direction, whereas in the event that the control duty DUT is set at a negative value, the throttle valve 3 is driven by the motor 6 in the valve closing direction.

When the return spring 4 is determined abnormal, the abnormality determination flag FFSETTHL is set at "1".

(3) An abnormality determination of the default spring 5 is implemented as below. Firstly, the throttle valve opening TH is controlled to become a second predetermined opening THCLS (for example, 0 degree), and then the output range of the control duty DUT of the driving signal is limited to from −90% to −2.5%, the throttle valve opening TH being controlled to become a second check opening THDFT (for example, 3.5 degrees) which is larger than the second predetermined opening THCLS but is smaller than the default opening THDEF. Namely, a feedback control to make the second check opening THDFT become the target-opening THCMD is executed. As a result, in the event that the throttle valve opening TH can be controlled to fall within a predetermined rage including the second check opening THDFT, the default spring 5 is determined normal, whereas in the event that no such control is possible, the default spring 5 is determined abnormal. With the output range of the control duty DUT being limited from −90% to −2.5%, in the event that the default spring 5 is normal, a feedback control to make the throttle valve opening TH become the second check opening THDFT can be executed. However, in the event that the default spring 5 is abnormal, no biasing force is applied which biases the throttle valve 3 in the valve opening direction and thus the throttle valve opening TH cannot be controlled to become the second check opening THDFT, thereby making it possible to determine that the default spring 5 is abnormal.

When the default spring 5 is determined abnormal, the abnormality determination flag FFSETTHL is set at "1".

Note that the processes of determining the abnormality of the return spring 4 and the default spring 5 are executed immediately after an ignition switch is switched off while the vehicle is being parked.

Thus, when there occurs an abnormality in the throttle valve driving apparatus, or to be more specific, when abnormality is detected on either of the throttle valve position sensors 8M, 8S, on either of the accelerator sensors 9M, 9S, on the return spring 4 or on the default spring 5, an abnormality determinations flag FFSETTHL is set at "1". However, in (1) b) above, when either of the throttle valve position sensors 8M and 8S is determined abnormal with a throttle valve opening sensor abnormality flag FTHD being set at "1", as has been described above, the power supply to the motor 6 is stopped.

Next, referring to FIGS. 2 to 4, a fail-safe processing that occurs when the abnormality determination flag FFSETTHL is set at "1" will be described below.

Figure 2:
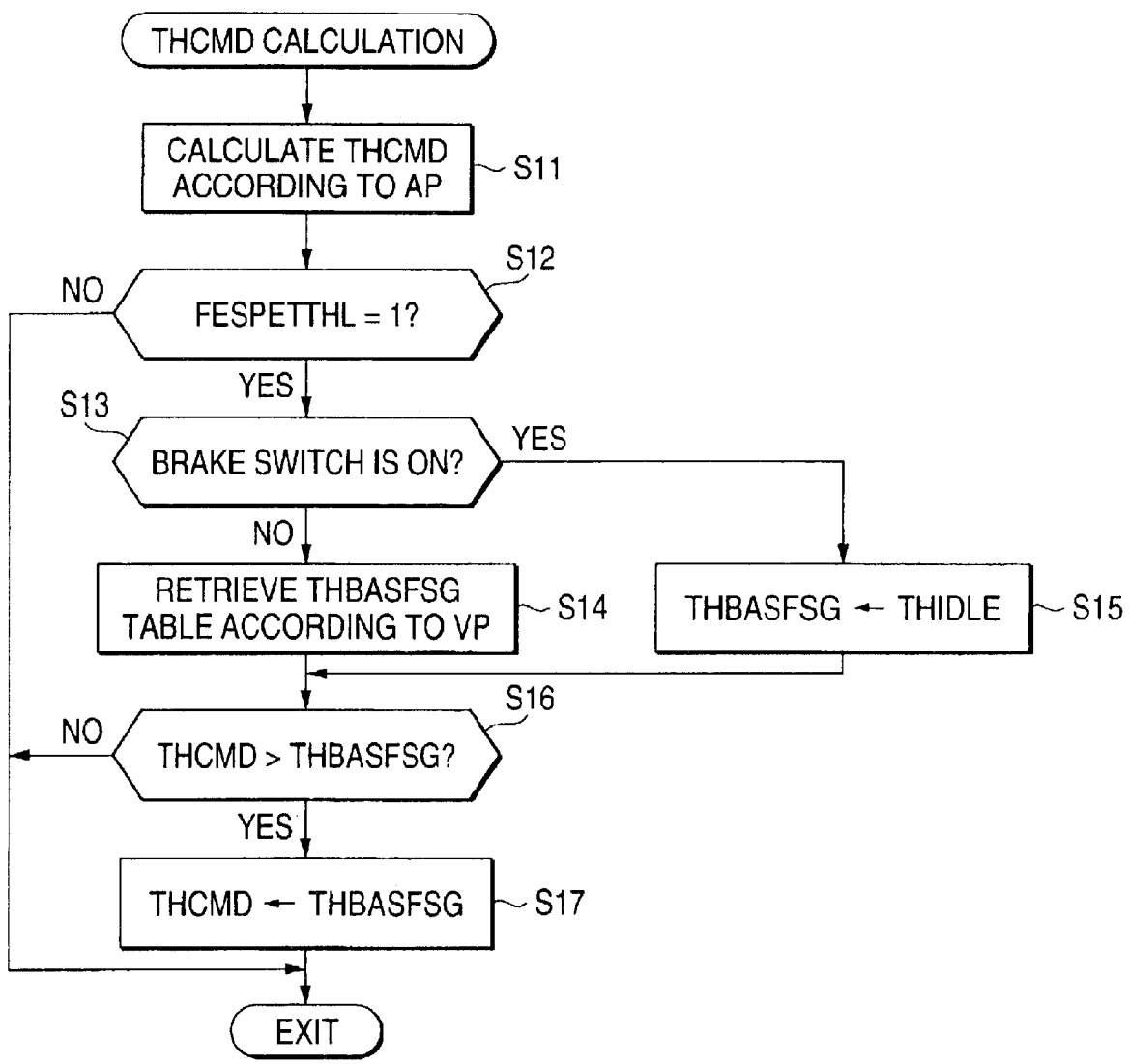
FIG. 2 is a flowchart of a process of setting a target opening (THCMD) for a throttle valve.
Figure 3:
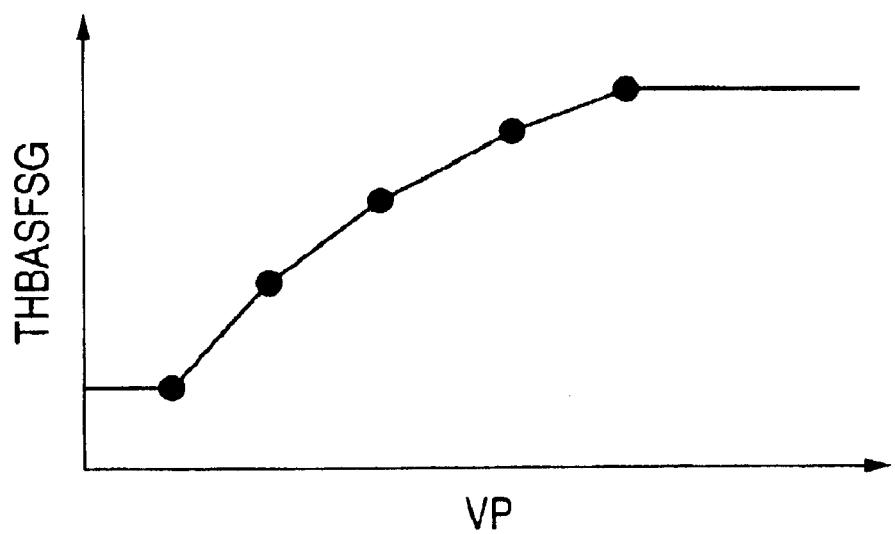
FIG. 3 is a drawing showing a table for use in the process shown in FIG. 2.

FIG. 2 is a flowchart of a process of setting a target opening THCMD. This process is executed in the CPU of the ECU 7 every predetermined time (for example, 2 milliseconds).

In step S11, a target opening THCMD is calculated according to an accelerator pedal operation amount AP. The target opening THCMD is set to-be substantially proportional to the accelerator pedal operation amount AP.

In step S12, whether or not the abnormality determination flag FFSPETTHL is "1" is determined, and in case FFSPETTHL=0 and no abnormality id detected, this process is terminated immediately. Namely, the target opening THCMD calculated in step S11 is applied as it is and a feedback control is executed so that the throttle valve opening TH coincides with the target opening THCMD.

In case FFSPETTHL is "1" in step 12 with an abnormality occurring in the throttle valve driving apparatus, whether or not the brake switch 11 has been switched on is determined (step S13). In case the brake switch 11 is off, a THBASFSG table shown in FIG. 3 is retrieved according to the vehicle speed VP, so that an upper limit value. THBASFSG of the target opening THCMD is calculated (step S14). The THBASFSG table is set such that the upper limit value THBASFSG increases as the vehicle speed VP becomes higher.

On the contrary, when the brake switch 11 is switched on, the process advances from step S13 to step S15, so that the upper limit value THBASFSG is set at a predetermined idle opening THIDLE. The predetermined idle opening THIDLE is smaller than the default opening THDEF and is an opening which can maintain the engine speed at in the order of 550 to 750 rpm.

In the following step S16, whether or not the target opening THCMD calculated in step S11 is larger than the upper limit value THBASFSG is determined, and-in case THCMD≦THBASFSG, the process is terminated immediately. Alternatively, in case THCMD>THBASFSG, the target opening THCMD is changed to the upper limit value THBASFSG (step S17).

Figure 4:
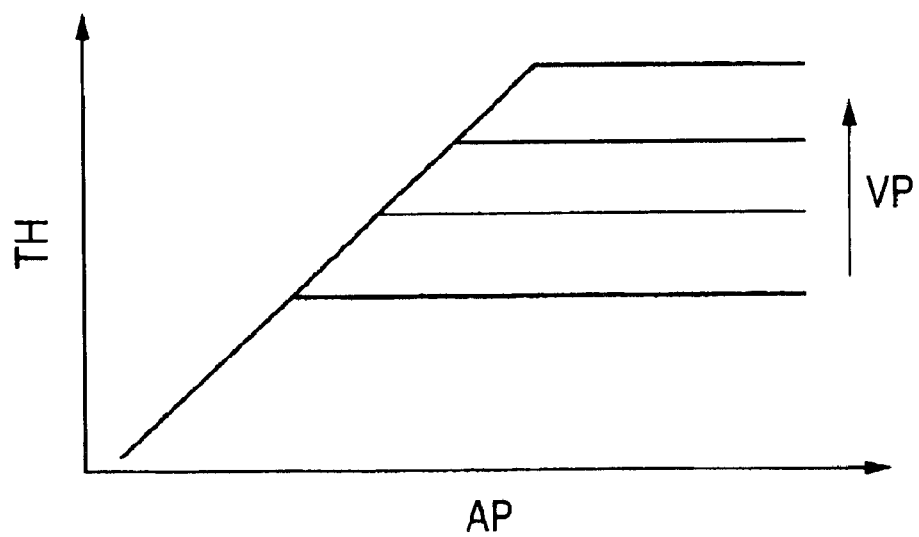
FIG. 4 is a drawing showing the relationship between an accelerator pedal depression amount (AP) and a throttle valve opening (TH).

According to the process in FIG. 2, when the abnormality of the throttle valve driving apparatus is detected with the abnormality determination flag FFSPETTHL being set at "1", as shown in FIG. 4, the throttle valve opening TH is controlled within a range of the upper limit value THBAS-FSG which corresponds to the vehicle speed VP. As a result, a throttle valve opening control which fits the vehicle speed VP can be implemented, and in the event that an abnormality determination is made while the vehicle is running on, for example, a highway, the vehicle is allowed to continue to run without decreasing the running speed thereof more than required. As this occurs, since the upper limit value THBAS-FSG is set at a larger value as the vehicle speed increases higher, in the event that the vehicle speed VP is relatively high, that high vehicle speed can be maintained or the vehicle speed can be decreased gradually, a drastic decrease in drivability being thereby prevented.

In addition, when the brake pedal is operated with the brake switch 11 being switched on, since the throttle valve opening TH is controlled to become-equal to or less than the predetermined idle opening THIDLE, when the driver intends to reduce the speed of the vehicle, the engine speed can be decreased in an ensured manner to thereby ensure the safety.

In this embodiment, the motor 6 corresponds to the driving unit, and the return spring 4 and the default spring 5 to the biasing unit. In addition, the accelerator sensors 9M, 9S correspond to the accelerator operation amount detecting unit, and the throttle valve position sensors 8M, 8S to the throttle valve opening detecting unit. Additionally, the ECU 7 constitutes the target opening setting unit, the driving control unit, the abnormality determining unit and the limiting unit. To be more specific, step S11 in FIG. 2 corresponds to the target opening setting unit, a drive control process (not shown) which is executed by the CPU of the ECU 7 and which implements a feedback control so that the throttle valve opening TH coincides with the target opening THCMD corresponds to the driving control unit, and an abnormality determination process (not shown) which is executed by the CPU of the ECU 7 and which determines on abnormality of the throttle valve driving apparatus corresponds to the abnormality determining unit, steps S13 to S17 in FIG. 2 corresponding to the limiting unit.

Note that the invention is not limited to the embodiment and can be modified in various ways. For example, an abnormality determination is carried out on the brake switch 11, and when an abnormality is detected in the brake switch 11, the drive of the throttle valve. 3 by the motor 6 is stopped without implementing the aforesaid process of setting the target opening THCMD, and the throttle valve opening TH may be made to become the default opening THDEF. The abnormality determination of the brake switch 11 is implemented by determining that the brake switch 11 is abnormal when the output voltage of the brake switch 11 is fixed to "0" V or to the supply voltage, or when the output of the brake switch 11 remains the same in spite of the fact that the vehicle has run for a predetermined period of time.

In addition, the invention can be applied to a throttle valve driving apparatus of an engine for propelling a boat such as an outboard engine in which a crankshaft is oriented vertically.

As has been described in detail heretofore, according to the first aspect of the invention, since the throttle valve opening is limited according to the vehicle running speed when the throttle valve driving apparatus is determined abnormal, a throttle valve opening limitation which fits the vehicle running speed can be implemented. As a result, in the even that an abnormality determination is made while the vehicle is running on, for example, a highway, the vehicle is allowed to continue to run without decreasing the running speed more than required.

According to the second aspect of the invention, since the throttle valve opening is limited to the predetermined idle opening or less when the brake pedal is operated, when the driver intends to decrease the speed of the vehicle, the engine speed can be decreased in an ensured fashion to thereby ensure the safety.

According to the third aspect of the invention, since the upper limit value of the throttle valve opening is set at a larger value as the vehicle running speed increases higher, in the event that the vehicle running speed is high at the time of abnormality determination, the opening of the throttle valve is permitted to a relatively larger upper limit value. As a result, the speed of the vehicle can be maintained relatively high or can be decreased gradually.

What is claimed is:

1. A control system for a throttle valve driving apparatus which comprises a driving unit for driving a throttle valve provided along an induction system of an internal combustion engine installed in a vehicle, a biasing unit for holding the throttle valve at a predetermined hold opening while the throttle valve is not driven by the driving unit, an accelerator operation amount detecting unit for detecting an operation amount of an accelerator pedal of the vehicle and a throttle valve position detecting unit for detecting an opening of the throttle valve, the control system comprising:

a target opening setting unit for setting a target opening for the throttle valve opening-based on the accelerator pedal operation amount;

a driving control unit for controlling the driving unit so that the throttle valve opening becomes the target opening;

an abnormality determining unit for determining an abnormality of the throttle valve driving apparatus;

a speed detecting unit for detecting a running speed of the vehicle; and a limiting unit for limiting the opening of the throttle valve according to the running speed of the vehicle when the abnormality of the throttle valve driving apparatus is determined by the abnormality determining unit.

2. A control system for a throttle valve driving apparatus as set forth in claim 1, wherein the limiting unit limits the throttle valve opening to a predetermined idle opening which is smaller than the predetermined hold opening, or less when a brake pedal of the vehicle is operated.

3. A control system for a throttle valve driving apparatus as set forth in claim 1, wherein the limiting at a larger value as the running speed of the vehicle increases.

4. A control system for a throttle valve driving apparatus as set forth in claim 2, wherein the limiting unit sets an upper limit value of the throttle valve opening at a larger value as the running speed of the vehicle increases.

5. A control method for a throttle valve driving apparatus which comprises a driving unit for driving a throttle valve provided along an induction system of an internal combustion engine installed in a vehicle, a biasing unit for holding the throttle valve at a predetermined hold opening while the throttle valve is not driven by the driving unit, an accelerator operation amount detecting unit for detecting an operation amount of an accelerator pedal of the vehicle and a throttle valve position detecting unit for detecting an opening of the throttle valve, the control method comprising:

setting a target opening for the throttle valve opening based on the accelerator pedal operation amount;

controlling the driving unit so that the throttle valve opening becomes the target opening;

determining an abnormality of the throttle valve driving apparatus;

detecting a running speed of the vehicle; and limiting the opening of the throttle valve according to the running speed of the vehicle when the abnormality of the throttle valve driving apparatus is determined.

6. A control method for a throttle valve driving apparatus as set forth in claim 5, wherein the limiting step limits the throttle valve opening to a predetermined idle opening which is smaller than the predetermined hold opening, or less when a brake pedal of the vehicle is operated.

7. A control method for a throttle valve driving apparatus as set forth in claim 5, wherein the limiting unit sets an upper limit value of the throttle valve opening at a larger value as the running speed of the vehicle increases.

8. A control method for a throttle valve driving apparatus as set forth in claim 6, wherein the limiting unit sets an upper limit value of the throttle valve opening at a larger value as the running speed of the vehicle increases.

* * * * *